United States Patent

[11] 3,607,088

| [72] | Inventor | Teruji Ishii |
| | | Tokyo, Japan |
| [21] | Appl. No. | 758,758 |
| [22] | Filed | Sept. 10, 1968 |
| [45] | Patented | Sept. 21, 1971 |
| [73] | Assignee | Cobble Company Limited |
| | | Tokyo, Japan |
| [32] | Priority | Mar. 22, 1968 |
| [33] | | Japan |
| [31] | | 43/18705 |

[54] APPARATUS FOR SIMULTANEOUSLY MEASURING TEMPERATURE OF REACTION AND PRESSURE IN VAPOR AND LIQUID PHASES OF VERY SMALL AMOUNT OF SAMPLE UNDER PRESSURE
14 Claims, 9 Drawing Figs.

[52] U.S. Cl. ........................................ 23/253,
23/253 PC, 23/255 E, 23/256
[51] Int. Cl. ...................................... G01n 25/22,
G01n 25/30, G01n 31/00
[50] Field of Search ........................... 23/230 PC,
232 E, 253, 253 PC, 255 E, 256, 254, 254 E, 255;
73/27

[56] References Cited
UNITED STATES PATENTS

| 2,638,426 | 5/1953 | Brace | 148/20.3 |
| 2,751,281 | 6/1956 | Cohn | 23/255 E |
| 2,970,041 | 1/1961 | Burlis et al. | 23/256 |
| 3,006,736 | 10/1961 | Green | 23/253 |
| 3,153,577 | 10/1964 | McCully et al. | 23/255 E |
| 3,179,499 | 4/1965 | Hampton | 23/253 PC |
| 3,323,872 | 6/1967 | Scott | 23/255 |
| 3,463,613 | 8/1969 | Fenske et al. | 23/230 PC |
| 3,031,267 | 4/1962 | Martin et al. | 23/198 |

*Primary Examiner*—Joseph Scovronek
*Attorney*—Helman & Stern

ABSTRACT: Disclosure is made of a method for simultaneously measuring and recording very slight changes in temperature and pressure of a very small mass or volume of a test sample under pressure, and of an apparatus therefor provided with a microautoclave applicable to both vapor and liquid phases, an electric furnace in which said microautoclave is adapted to fit and an automatic recorder containing an electric circuit necessary for achievement of the above-mentioned measurement.

INVENTOR.
T. ISHII

APPARATUS FOR SIMULTANEOUSLY MEASURING TEMPERATURE OF REACTION AND PRESSURE IN VAPOR AND LIQUID PHASES OF VERY SMALL AMOUNT OF SAMPLE UNDER PRESSURE

BACKGROUND OF THE INVENTION

Heretofore, in the case of reaction of a sample in vapor and liquid phases under pressure, it has been customary to use an autoclave designed to meet one purpose and then another autoclave designed to meet another purpose.

Also in the case of application of even a microautoclave capable of permitting the reaction of a small amount of sample under pressure, the temperature of the sample itself has not been measured but the temperature of the furnace only has been measured. Moreover the pressure of reaction has been measured by a pressure gauge by the naked eye, namely the so-called eyesight method.

When using a few milliliters of sample for reaction, as its endo- and exothermic heat capacity on reaction and the volume of vapor concerned with such reaction are very small, so are the variations in temperature and pressure in the system of reaction. Because of this, it has been hitherto very difficult to measure accurately such results by the usual eyesight method of reading the thermometer or pressure gauge directly or it has been virtually impossible. Moreover, with the conventional methods and apparatus of prior art, it has been impossible to obtain the relationship between pressure and temperature of reaction, time of reaction, etc. relative to the progress of reaction of the sample.

With a view to eliminating such drawbacks as mentioned above, the applicant of the present invention has succeeded in exploiting a method and apparatus for generally and accurately measuring pressure and temperature at beginning and end of such reaction and during the reaction and relative variations in pressure, temperature and time, using a microautoclave applicable to reactions in both vapor and liquid phases of a small mass or volume of test sample under pressure, which has been hardly expected from the conventional methods and apparatus heretofore.

BRIEF SUMMARY OF THE INVENTION

The primary object of the present invention is to provide a method and apparatus for simultaneously measuring temperature and pressure of reaction of both vapor and liquid phases of an extremely small mass or volume of test sample (on the order of a few grams) under pressure using a microautoclave. It is a further object of the invention to provide a method and apparatus for measuring generally, the time of beginning and end of reaction and relative variations in pressure and temperature of the test sample along with the progress of reaction. It is a still further object of the invention to provide a method and apparatus for automatically recording extremely slight variations in temperature and pressure of the test sample with excellent reproducibility and high sensitivity (0.05° C. and 0.2 kg./cm.$^2$) within the range of temperature measurement between −50 to 300° C. at a maximal pressure of 300 kg./cm.$^2$ in a rapid and satisfactory manner.

Namely, according to this method and apparatus, it is rendered possible to convert slight endo- and exothermic heat calories and slight variations in temperature and pressure into variations in electrical resistance by means of a thermistor and a pressure transducer with high sensitivity respectively so that such variations can be registered as variations in voltage by means of an electrical circuit and these variations are amplified for automatic recording by a recorder at one time. In order to achieve the aforesaid purpose, the substantial part of the present invention consists of a temperature measuring apparatus comprising a microautoclave, a plug body to close the top opening of the microautoclave, said plug body being formed with a hole for insertion of a thermistor, another hole for insertion of a driving shaft, an inlet hole for gas, an outlet hole for gas and a pressure applicable hole and having a thermistor and a driving shaft inserted in their respective holes, a furnace body housing an electric furnace in which said microautoclave and plug body can be set, and an electric circuit connected to said furnace body necessary for purposes of temperature measurement, whereby it is rendered possible to measure the time and temperature of reaction and pressure of an extremely small mass or volume of test sample in both vapor and liquid phases at one time. At the same time, in the case of reaction of vapor phase, a basket for catalyst is secured to the driving shaft provided in the plug body of said microautoclave on one hand and in the case of reaction of liquid phase, a stirring bar is secured to said driving shaft on the other hand whereby the container of test sample for reaction is put into the automicroclave for being set to the electric furnace, which is connected to a thermistor bridge circuit, a pressure transducer and an automatic recorder respectively and the microautoclave thus set to said electric furnace is heated so that the thermistor with high sensitivity can detect slight heat calories arising from the system of reaction and slight variations in temperature concerned with a small volume of vapor and the pressure transducer can convert the variations in pressure into variations of electrical resistance, thereby enabling them to be caught as variations in voltage which are further amplified by means of a bias electric source for automatic recording.

DETAILED DESCRIPTION

As one of the characteristics of the present invention, the construction of a microautoclave will be explained in detail with reference to a mode of embodiment by way of example as shown in the attached drawing. This microautoclave consists of a container 1 and a plug body 2 as the main components.

Figure 1:
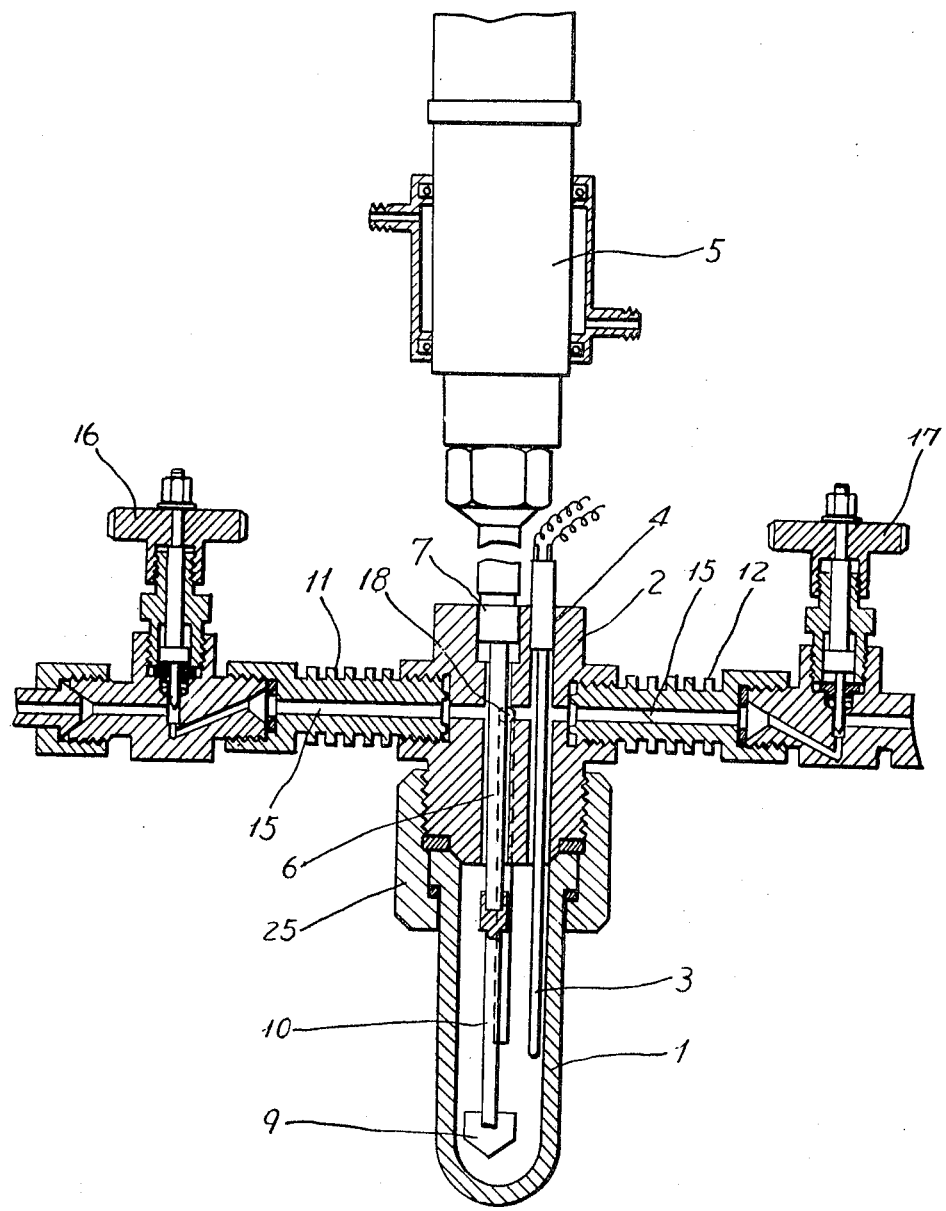
FIG. 1 is a view of a microautoclave in vertical cross section in the case of reaction of liquid phase, according to the present invention.
Figure 2:
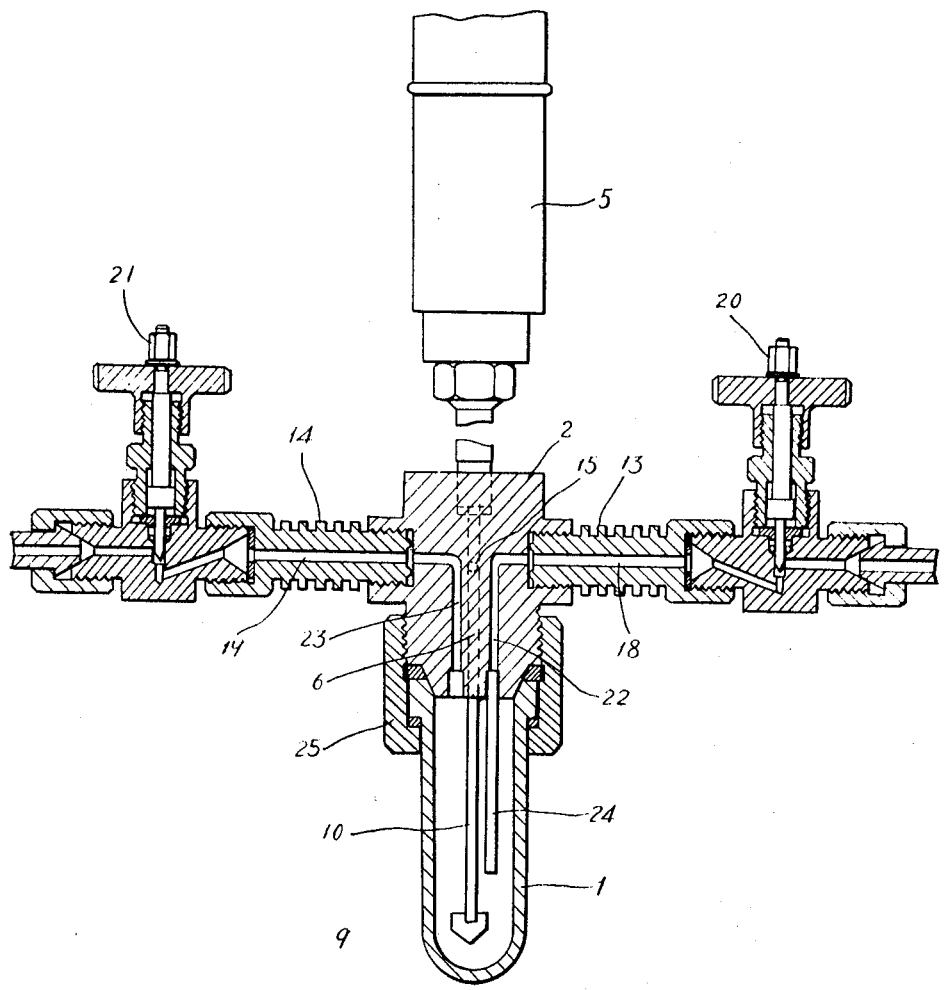
FIG. 2 is a view of the same in perpendicular cross section by a plane vertical to the cross section of the microautoclave of FIG. 1.
Figure 3:
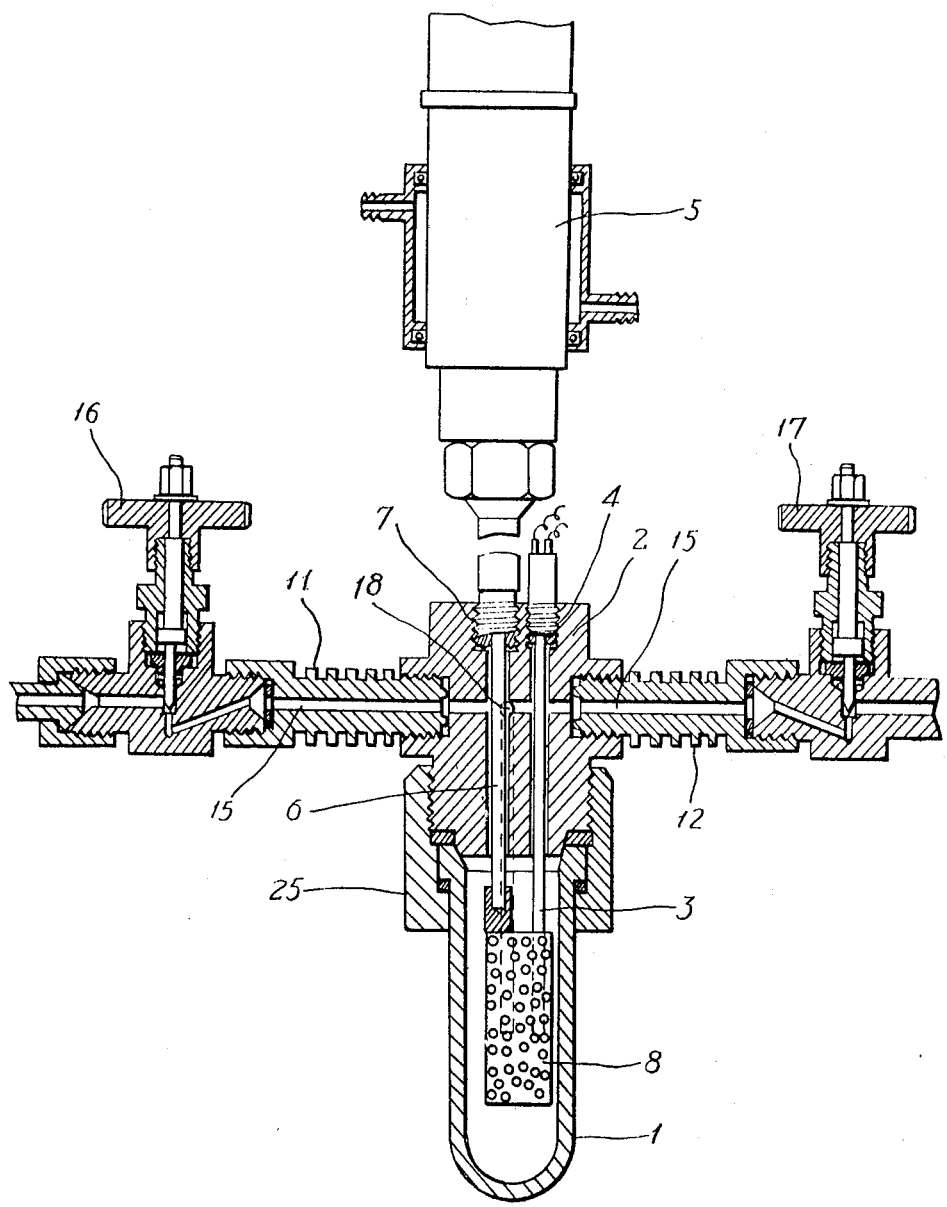
FIG. 3 is a view of microautoclave in vertical cross section in the case of reaction of vapor phase.
Figure 4:
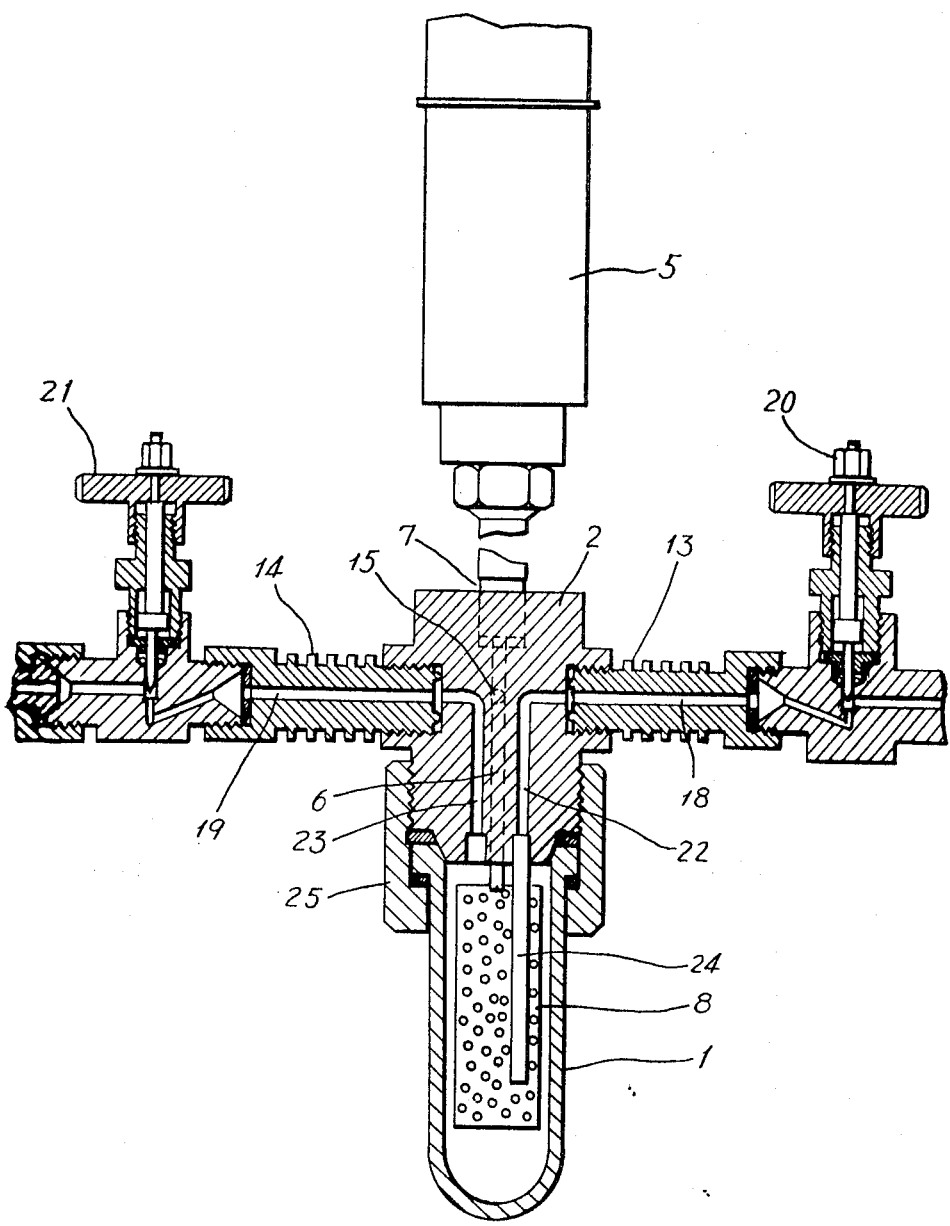
FIG. 4 is a view of the same in vertical cross section by a plane perpendicular to the cross section of the microautoclave of FIG. 3.

The container 1 may be, for example, a 30-ml. volumetric stainless cylinder with a round bottom, 70 cm. high, 36 mm. in diameter with its wall thickness 7 mm. The plug body 2 is provided with a hole 4 in generally central position for insertion of a thermistor 3 covered with stainless steel, for example, and another hole 7 for insertion of the driving shaft 6 of a motor 5 piercing therethrough. To this driving shaft 6 may be secured a basket 8 for catalyst (FIGS. 3 and 4) or a stirring bar 10 with a stirring blade at the lower end thereof in a freely removable manner (FIGS. 1 and 2), as the case may require. Moreover, said plug body 2 is provided with four conducting pipes 11, 12, 13 and 14 having a plurality of heat discharge ribs at right angles to each other in radial form around the center of said plug. One pair of two conducting pipes 11 and 12 arranged in one line are provided with a hole 15 piercing through the inside of said plug body. One piercing hole 15 is communicated with a pressure gauge (not shown) through a needle valve 16 and the other piercing hole 15 is communicated with a pressure transducer (not shown) through a needle valve 17.

Figure 5:
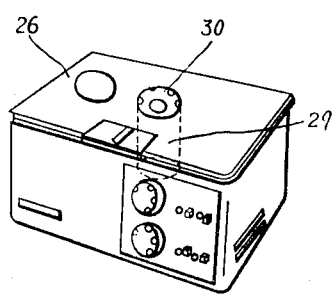
FIG. 5 is a perspective view of a furnace body with the setting of microautoclave and housing an electric furnace for heating purposes.
Figure 6:
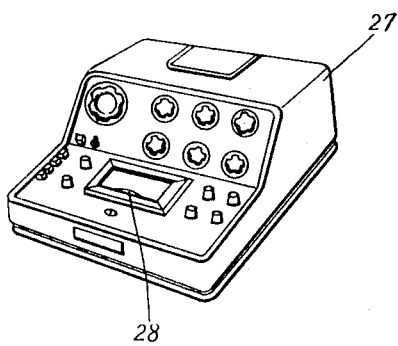
FIG. 6 is a perspective view of the main body of a measuring apparatus with a variable transformer, a meter and other parts, which is connected to said electric furnace shown in FIG. 5.
Figure 7:
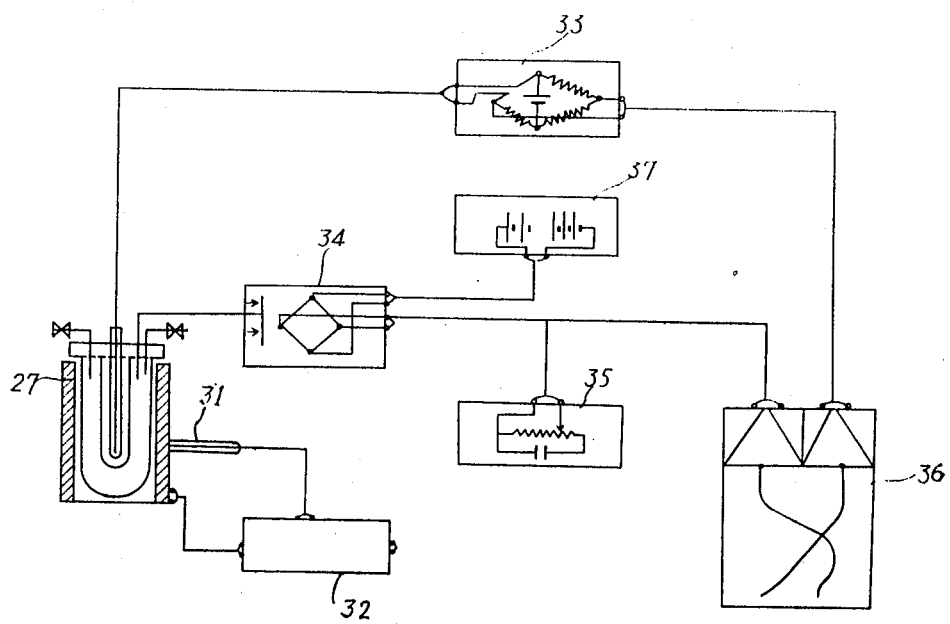
FIG. 7 is a diagrammatical view of the measuring apparatus itself illustrating a brief mechanism of an electric circuit for temperature and pressure of the measuring apparatus.

Perpendicular to the direction of one pair of said two conducting pipes 11 and 12 are the other pair of two conducting pipes 13 and 14, one of them 13 being provided with a gas lead-in hole 18 and the other 14 with an exhaust hole 19. Then said gas lead-in hole 18 is communicated with a gas supply pipe through a needle valve 20 and said exhaust hole 19 is connected to an air exhaust outlet through a needle valve 21. Said gas lead-in hole 18 and air exhaust hole 19 in said conducting pipes 13 and 14 respectively (towards said plug body 2) are inwardly connected to a gas lead-in hole 22 and an air exhaust hole 23 respectively which are formed in bending condition towards the bottom of said plug body 2. Moreover, from said plug body 2 is extended said gas lead-in pipe 24 at the time of insertion to enter said stainless container 1. Said air exhaust hole 23 is opened in said stainless container. Said container 1 of the microautoclave is connected to said plug body 2 by means of threaded joints 25 in a freely removable manner. There are also provided a furnace body 26 (FIG. 5) and the main body of apparatus 27 (FIG. 6) for measuring thermal properties. Said main body 27 is provided with a temperature meter 28, a variable transformer and switches necessary for temperature measurement. Separately, said furnace body 26 is provided with an electric furnace 29 and a portion 30 for setting the microautoclave to said electric furnace 29. These members include a temperature adjusting thermistor 31, a temperature adjuster 32, a thermistor bridge circuit 33, a pressure transducer 34 of four-gauge type, a bias electric source 35, a two-pen recorder 36 and an electric source 37 of constant voltage, all these members being connected together by means of a circuit to constitute said measuring apparatus as shown in FIG. 7. There are provided three kinds of thermistor, one for low temperatures between −50 and +50° C., another for middle temperatures between −5 and +200° C. and the other for high temperatures between 195 and 300° C. Said pressure transducer is used in the form of one of a water-cooled, four-gauge type.

Now a detailed explanation will be made hereinafter concerning the method of the present invention for measuring temperatures of an extremely small mass or volume of test sample in both vapor and liquid phases under pressure. Firstly, with reference to the reaction of vapor phase, the synthesis of methane by reducing carbon dioxide gas with hydrogen gas under high pressure will be explained as a suitable example hereinafter.

First of all, the basket 8 is secured to the driving shaft 6 such that both thermistor 3 and gas lead-in pipe 24 can be placed in the basket 8. Next, about 10 g. of Ru-alumina catalyst (0.5 percent) is put into the basket 8. At this time, the needle valve 20 is kept open so that the air in the microautoclave can be replaced by a little amount of carbon dioxide being fed from the gas lead-in hole 18. Then the needle valve 21 for the air exhaust outlet is closed, causing carbon dioxide gas, 1 kg./cm.$^2$ to fill the microautoclave from the gas lead-in hole 18 and also hydrogen gas, 16 kg./cm.$^2$ to fill the microautoclave from the gas lead-in hole 18. At this stage, two needle valves 16 and 20 are closed while leaving the needle valve 17 only to open to the side of the pressure transducer of four-gauge type. In this manner, the microautoclave filled with gas for reacting purposes is set to the portion 30 of the electric furnace 29. The test sample (carbon dioxide gas and hydrogen gas) in the microautoclave thus set can be heated by the electric furnace 29.

In this case, the electric furnace 29 can be adjusted by means of a variable transformer and if further necessary, by means of a temperature adjusting thermistor 31 in contact with the furnace and a temperature adjuster 32 coworking with said thermistor.

While both carbon dioxide and hydrogen gases are reacted, the slight variations in temperature occurring along with the progress of reaction are detected by the thermistor 3 and those in pressure by the pressure transducer of four-gauge type so that these variations can be converted to variations in voltage through their respective measuring circuits or, if need be, connected to a bias power source 35 suitable for use in magnified recording and recorded by tracing, using a two-pen recorder 36. Each curve of temperature and pressure thus drawn is found to rise upwardly in the form of a straight line due to heating by the electric furnace 29, but if any slight variation should occur in the system of reaction, these curves will bend at certain points indicating that such variations have occurred in the system of reaction at a temperature and pressure corresponding to said bending points.

In the case of reaction, for example, this reaction is understood to have started under such and such conditions at said bending points. On further heating, the relationship between temperature and pressure will be deviated markedly from the rule of thermodynamics, that is to say, the degree of variations in this system of reaction will become largest at the temperature and pressure which have risen up to a maximum.

When the variations in the system of reaction are terminated, said curves will rise up again and in this manner, the end point of these variations can be measured from the results shown on a recording chart.

Figure 8:
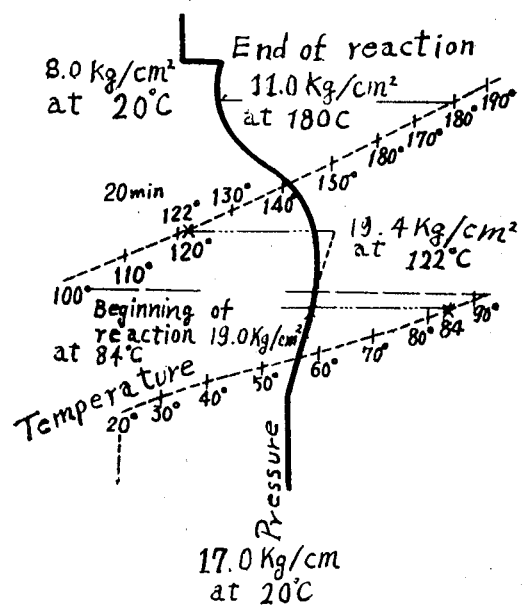
FIG. 8 is a view graphically showing the relationship in curved form between temperature and pressure in the case of synthesizing methane by reaction of carbon dioxide gas with hydrogen gas in contact.

FIG. 8 shows a curve arising from the reaction of carbon dioxide gas with hydrogen gas under pressure. On investigation of this curve, the reaction is found to start at 84° C. under pressure, 19.0 kg./cm.$^2$. While the temperature is seen rising up continuously further in the form of a straight line, the rise of the curve of pressure becomes slackened and then begins to drop until the end point of such depression can be found as the time of termination of reaction.

Then the duration of this reaction is known to be 1 hour and 45 minutes and its initial pressure is 17.0 kg./cm.$^2$ (20° C.), while its terminal pressure is found to be 8.0 kg./cm.$^2$ (20° C.), to be exact.

Figure 9:
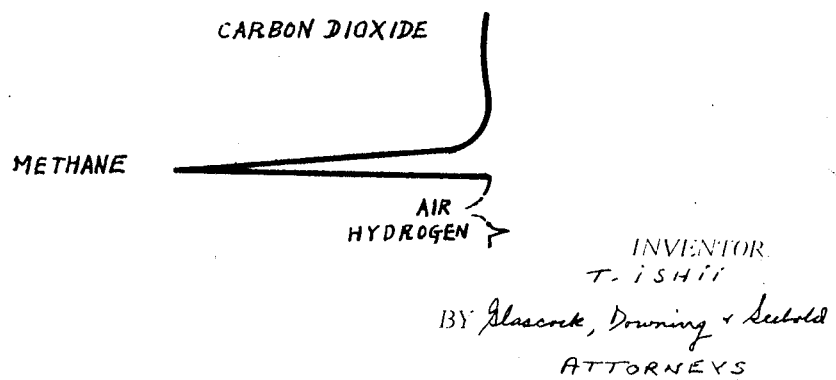
FIG. 9 is a view of gas chromatography for identification of methane obtained by reaction of carbon dioxide gas with hydrogen gas as shown in FIG. 8.

As the result of reaction of carbon dioxide gas with hydrogen gas under high pressure, the gas thus generated can be identified with methane gas from the gas chromatography of methane as shown in FIG. 9.

Next, in the case of reaction of liquid phase (reaction between liquid and gas), the stirring bar 10 is secured to the driving shaft 6 disposed in the stainless container of the microautoclave, and in this case a test sample of liquid must be put in the stainless container beforehand.

At this stage, the stirring blade 9 disposed at the lower end of the stirring bar is placed in the liquid of reaction and the bead portion of the thermistor 3 is embedded therein.

Subsequently the needle valve 21 to the side of the air exhaust hole 19 is closed and a little amount of gas is conducted from the gas lead-in hole 18 in the same manner as in the reaction of vapor phase thereby replacing the air in the microautoclave by said gas and filling it for reacting purposes.

At this stage, the needle valve 17 only to the side of the pressure transducer 34 is opened and the remaining three needle valves 16, 20 and 21 are closed.

In this manner, the microautoclave with lead-in gas for reaction with the test sample of liquid is set to the setting portion 30 of the electric furnace 29 so that the test sample can be heated thereby.

Likewise in the case of vapor phase reaction, the slight variations in temperature along with the progress of reaction can be registered by the circuit 33 of the thermistor bridge and those in pressure registered by the pressure transducer 34, as variations in resistance, can be converted to variations in voltage, and if necessary, they are connected to the bias power source 35 for purposes of magnified recording so that they can be trace-recorded by the two-pen recorder 36.

As has been described in detail hereinbefore, according to the method of the present invention using a single microautoclave, it is possible to cause the reaction of an extremely small mass or volume of test sample in both vapor and liquid phases under high pressure in a simple manner to catch slight variations in temperature and pressure occurring on reaction as mentioned above, with high sensitivity at a time, to determine the time of beginning and end of reaction, and to obtain the relative conditions of temperature, pressure and time in a precise manner.

Thus the method of the present invention is entitled to ensure the possibility of automatic recording of test results with high accuracy and good reproducibility in a rapid manner. Indeed, with the conventional methods and apparatus of prior art heretofore, it has been quite impossible to measure generally the relative conditions of very slight variations in temperature and pressure and time of reaction of an extremely small mass or volume of test sample under pressure at a given time. In contrast, with the apparatus of the present invention, all the above mentioned purposes have been achieved satisfactorily.

What is claimed is:

1. An apparatus for measuring small changes in the temperature and pressure of reaction of an extremely small mass or volume of a test sample in vapor phase under pressure, comprising a microautoclave body defining a container for the test sample and having an open top, a plug closing said open top, a thermistor means passing through said plug into said container, a driving shaft, portions of which pass through said plug into said container, means exterior of said container driving said shaft, the portions of said shaft extending into said container having detachably secured thereto a catalyst-basket, means for feeding gas into said container through said plug, means for exhausting gas from said container through said plug, means for applying pressure within said container through said plug, means communicating with the interior of said container for measuring small changes in pressure of the gas, an electric furnace receiving said microautoclave body therein in heating relationship, and electric circuit means operatively connected to said furnace for effecting measurements.

2. An apparatus according to claim 1 wherein said means for measuring small changes in pressure of the gas comprises a pressure transducer, first conduit means operatively communicating said pressure transducer with said container through said plug; a pressure gauge, a second conduit means operatively communicating said pressure gauge with said container through said plug, said means for feeding gas including gas supply means and a third conduit means operatively communicating said gas supply means with said container through said plug, said means for exhausting gas including exhaust means and fourth conduit means operatively communicating said exhaust means with said container through said plug, and needle valves operatively associated in each of said conduit means.

3. An apparatus in accordance with claim 2 wherein said conduit means include pipes communicating with radially extending passageways through said plug, and heat discharge ribs on each of said pipes.

4. An apparatus according to claim 2 wherein said first and second conduit means are aligned with each other and extend from opposite sides of said plug.

5. An apparatus according to claim 4 wherein said third and fourth conduit means are aligned with each other and extend perpendicularly to said first and second conduit means through said plug.

6. An apparatus according to claim 2 wherein said pressure transducer is a water-cooled pressure transducer.

7. An apparatus according to claim 1 wherein said thermistor means includes a low temperature thermistor means capable of measuring temperatures between −50 and +50° C., a middle temperature thermistor means capable of measuring temperatures between −5 and +200° C. and a high temperature thermistor means capable of measuring temperatures between +195 and +300° C.

8. An apparatus for measuring small changes in the temperature and pressure of reaction of an extremely small mass or volume of a test sample in liquid phase under pressure, comprising a microautoclave defining a container for the test sample and having an open top, a plug closing said open top, a thermistor means passing through said plug into said container, a driving shaft, portions of which pass through said plug into said container, means exterior of said container driving said shaft, the portions of said shaft extending into said container having detachably secured thereto a stirrer, means for feeding gas into said container through said plug, means for exhausting gas from said container through said plug, means for applying pressure within said container through said plug, means communicating with the interior of said container for measuring small changes in pressure of the gas, an electric furnace receiving said microautoclave body therein in heating relationship, and electric circuit means operatively connected to said furnace for effecting measurements.

9. An apparatus according to claim 8 wherein said means for measuring small changes in pressure of the gas comprises a pressure transducer, first conduit means operatively communicating said pressure transducer with said container through said plug; a pressure gauge, a second conduit means operatively communicating said pressure gauge with said container through said plug, said means for feeding gas including gas supply means, and a third conduit means operatively communicating said gas supply means with said container through said plug, said means for exhausting gas including exhaust means and fourth conduit means operatively communicating said exhaust means with said container through said plug, and needle valves operatively associated in each of said conduit means.

10. An apparatus in accordance with claim 9 wherein said conduit means includes pipes communicating with radially extending passageways through said plug and heat discharge ribs on each of said pipes.

11. An apparatus according to claim 9 wherein said first and second conduit means are aligned with each other and extend from opposite sides of said plug.

12. An apparatus according to claim 11 wherein said third and fourth conduit means are aligned with each other and extend perpendicularly to said first and conduit means through said plug.

13. An apparatus according to claim 9 wherein said pressure transducer is a water-cooled pressure transducer.

14. An apparatus according to claim 8 wherein said thermistor includes a low temperature thermistor means capable of measuring temperatures between −50° and +50° C., a middle temperature thermistor means capable of measuring temperatures between −5° and +200° C., and a high temperature thermistor means capable of measuring temperatures of between +195° and +300° C.